M. J. HILBERG.
AUTOMOBILE CABINET ATTACHMENT.
APPLICATION FILED AUG. 11, 1919.
1,376,693.
Patented May 3, 1921.
2 SHEETS—SHEET 1.
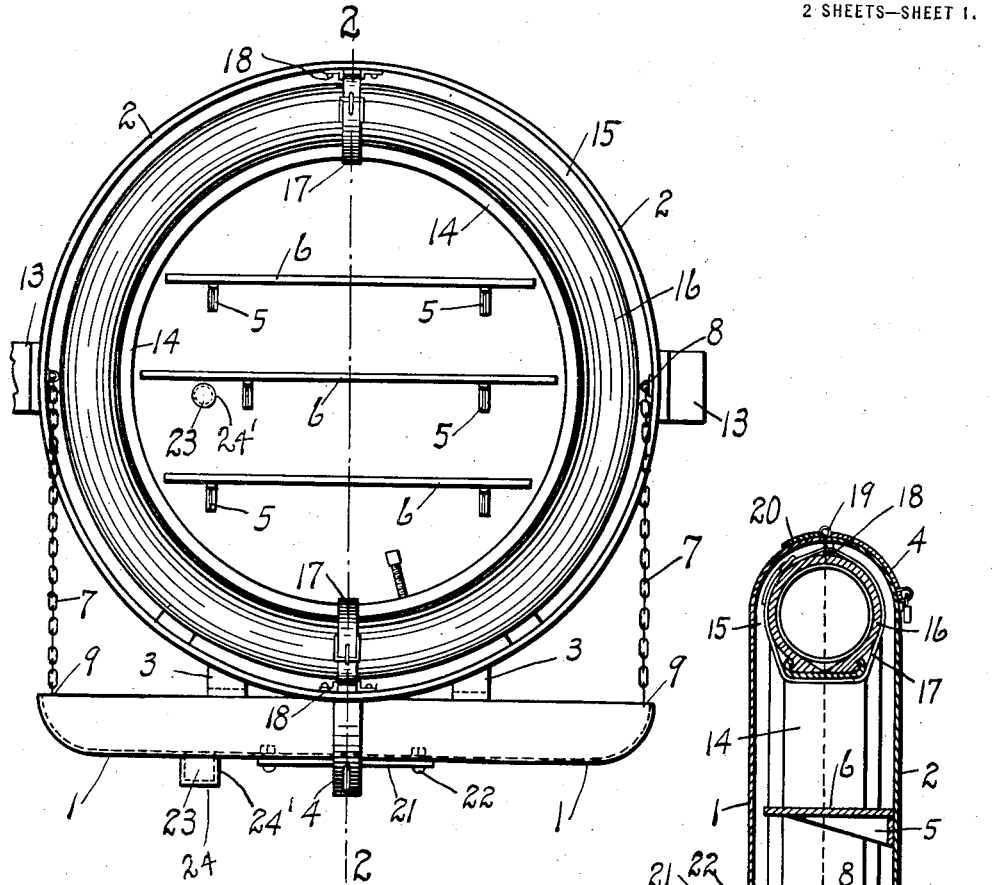
Fig. 1
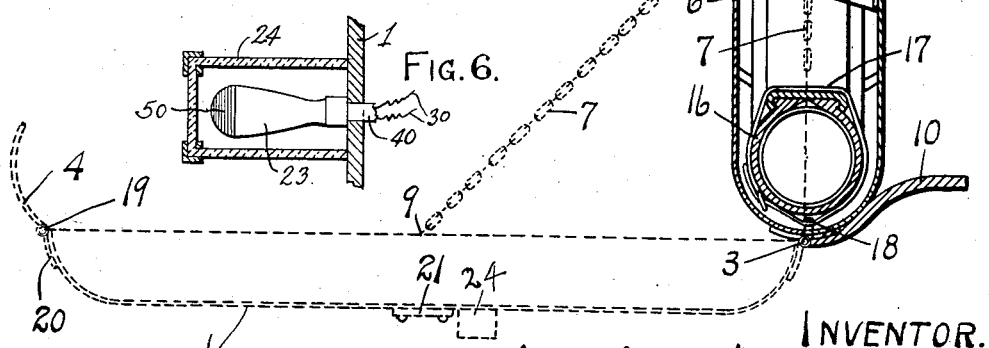
Fig. 6.
Fig. 2.
INVENTOR.
Michael J. Hilberg
by John W. Drehli
ATTORNEY.

M. J. HILBERG.
AUTOMOBILE CABINET ATTACHMENT.
APPLICATION FILED AUG. 11, 1919.

1,376,693.

Patented May 3, 1921.
2 SHEETS—SHEET 2.

INVENTOR.
Michael J. Hilberg
by John R. Trehli
ATTORNEY.

UNITED STATES PATENT OFFICE.

MICHAEL J. HILBERG, OF NORWOOD, OHIO.

AUTOMOBILE CABINET ATTACHMENT.

1,376,693.  Specification of Letters Patent.  Patented May 3, 1921.

Application filed August 11, 1919. Serial No. 316,820.

*To all whom it may concern:*

Be it known that I, MICHAEL J. HILBERG, a citizen of the United States, residing at the city of Norwood, in the county of Hamilton and State of Ohio, have invented certain new and useful Improvements in Automobile Cabinet Attachments, of which the following is a specification.

The object of my invention is to produce a cheap, simple and unique cabinet attachment for automobiles or like vehicles, for holding the extra or spare tire or tires usually carried by this class of vehicles, and to also hold the tools and necessary parts and articles now carried by the tool box or chest.

I preferably attach this cabinet to the rear of the vehicle, but it may be placed at the side thereof if desired. In the present instance, I show the cabinet of a circular or rounded shape, but I may make it of any desired contour.

It consists essentially of two dish shaped parts, one forming the back and the other the front of the cabinet, hinged together, so that one can be opened as a door or opening and closing means to reach the inside of the cabinet. The two parts form a compartment for holding the tires and tools and other parts, which I have called a cabinet.

The cabinet keeps the tires safe from the elements and helps to protect them from theft, and the license tag and light at the rear of the cabinet are arranged in an unique manner, as will be hereafter pointed out.

Figure 3:
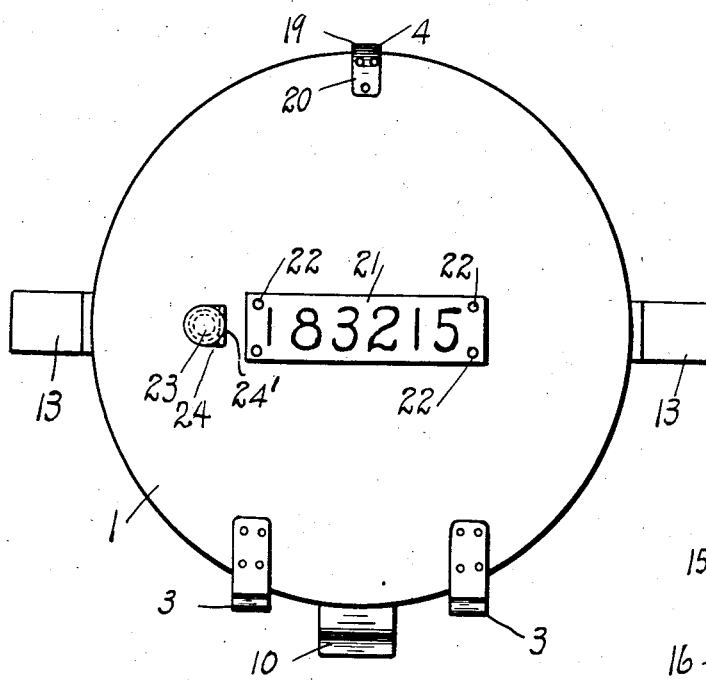
Figure 5:
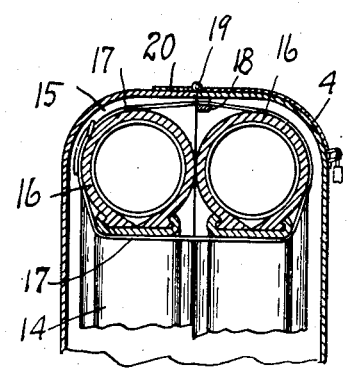
Figure 4:
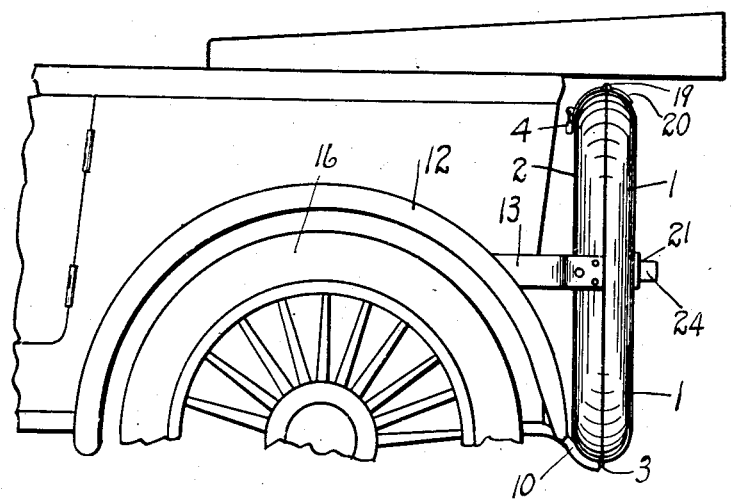

In the accompanying drawings forming part of this specification:

Figure 1, is a front view of the cabinet in elevation, open and the door hanging suspended, Fig. 2, is a longitudinal section on the lines 2—2 of Fig. 1, the door is however closed, and shown open in dotted lines, Fig. 3, is a front view, the cabinet shown closed, Fig. 4, is a side elevation of the cabinet shown closed and attached to the rear of an automobile, the automobile partly broken away, and Fig. 5, is a sectional view, broken away, showing how the cabinet may hold two tires, and Fig. 6, is a section of the wall of the casing broken away and a section of the hood into which the tail light extends, the tail light and wires being shown in elevation.

The case of the cabinet is, in the present instance, formed of two dish shaped parts or pieces 1 and 2, hinged together at the bottom by hinges 3. They are connected together at the top by a hasp and lock part 4, the lock being at the rear of the cabinet.

These parts 1 and 2 may be of any other shape and connected together in any manner and may be made of any material, but they are usually stamped out of sheet metal.

In the present instance, I attach to the rear part 2, brackets as 5 carrying shelves 6. I show three shelves, but may use any number and make them of any form and shape best to support the tools and small automobile repair parts, and to prevent rattling and shifting of said tools.

At each side of the cover or door 1, I attach one end of chains as 7, which pass over sheaves as 8 (see Fig. 2) and are attached at their other ends at 9, so that when the lid or cover 1 is opened, they hold or suspend it so that the tools can be laid thereon, or the tires reached. The cover may be suspended or held in any other manner.

The cabinet is connected to the chassis of the car by arms or supports 10, and to the frame work near the fenders 12 by arms 13, but may be connected in any manner.

In stamping the dish shaped parts 1 and 2, they are formed with peripheral edges, which meet to form a tight joint, in other words, they are complementary parts.

The inner rim of the tire is marked 14 and the space between the periphery of the tire and the walls of the compartment are marked 15; the tire is marked 16. The tire is held in position against displacement or play by strap fastening connections as 17, which are connected at 18 to the inside of the cabinet and are provided at one end with a buckle and at the other end with the usual strap, and provided with holes as straps are ordinarily used, but they may be held in place in any desired manner.

The hasp and lock connection 4 is usually connected by a hinge 19 to part 1, a small guide brace also being present at 20, to complete the connection.

On the part 1 I fasten the license tag 21 through the medium of bolt and nut connections 22 connecting the nut on the bolt on the inside so that when the part 1 is closed or locked, no access can be had to take off the license tag.

The tail light 23 is connected to the forward end of the tube 40 which passes through the compartment, said light and tube projecting through an aperture in the casing member 1, and through which tube 40 pass the electric wires 30 to light the lamp.

A hood 24 covers the lamp 23 when the parts 1 and 2 are closed and locked. This light is red in front as shown at 50, Fig. 6, but at its inner side 24' shows white, so that whether the device is closed or open the red light will always show, and when closed the light shining through the side 24' will throw its rays on the tag 21, and when the part 1 is open the rays of light through the side 24 will shine into the compartment, and the operator can readily take out the tire 16 or take out any tools or repair parts off of the shelves 6. Hood 24 is made of metal and glass.

When the side or door 1 is open and suspended, it forms a table or support upon which to arrange or place the tools or repair parts, so that the operator can work conveniently, quickly and satisfactorily.

It will be readily seen that the door or part 1 can be quickly opened, the tools laid thereon and the work proceed, and when completed, the parts can be placed back into the compartment of the cabinet and the part 1 closed and locked.

This cabinet can be made plain or can be ornamental, so that it will give a pleasing appearance and not in any way mar the appearance of the machine.

While I have described one specific form of carrying my invention into effect, it will be readily understood and apparent that the same is capable of some modification and change, and I wish to be understood as claiming that such change will still fall within the scope of my invention.

What I claim as new and my invention and desire to secure by Letters Patent, is:

1. In an automobile cabinet of the character described, a body portion, composed of two complementary parts forming a compartment, means provided therein for supporting a tire and tools, one part capable of being opened and closed, a tube passing through said compartment, electric wires passing therethrough, a tail light, said tail light carried at the forward end of said tube, the part which is capable of being opened and closed carrying a hood, into which the tail light passes, when the cabinet is closed.

2. In an automobile cabinet of the character described, a body portion, composed of two complementary parts, forming a compartment, means provided therein for supporting a tire and tools, one part capable of being opened and closed, a tail light and electric wires, means for supporting said tail light and wires, the part which is capable of being opened and closed carrying a hood, into which the tail light passes, when the cabinet is closed.

3. In an automobile cabinet of the character described, a body portion, forming a compartment, one part of said body part capable of being opened and closed and carrying a hood on its outer surface, an extension and electric wires, supported thereon passing through said body portion and a tail light supported at the end of said extension, said tail light passing into the hood, when the body portion is closed.

4. In an automobile cabinet of the character described, a body portion composed of two parts, forming a compartment, one part capable of being opened and closed and carrying the license tag of the machine on the outside thereof, a tail light supported in the cabinet and extending through said compartment capable of being opened and closed and being independent of the opening and closing part, and showing a red light at its outer extremity and throwing light rays laterally onto the license tag, when the opening and closing part is closed.

In testimony whereof, I affix my signature at Cincinnati, Ohio, this 8th day of August, 1919.

MICHAEL J. HILBERG.